(12) United States Patent
Hoerz et al.

(10) Patent No.: US 11,190,064 B2
(45) Date of Patent: Nov. 30, 2021

(54) ELECTRICAL MACHINE, IN PARTICULAR FOR A VEHICLE

(71) Applicant: MAHLE International GmbH, Stuttgart (DE)

(72) Inventors: Mirko Hoerz, Esslingen (DE); Hans-Ulrich Steurer, Stuttgart (DE); Josef Sonntag, Nuertingen (DE); Stojan Markic, Kojsko (SI); Andrej Licen, Branik (SI); Aleks Medvescek, Rence (SI); Peter Sever, Murska Sobota (SI); Philip Grabherr, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 138 days.

(21) Appl. No.: 16/727,920

(22) Filed: Dec. 27, 2019

(65) Prior Publication Data
US 2020/0136445 A1   Apr. 30, 2020

Related U.S. Application Data

(63) Continuation of application No. PCT/EP2018/067108, filed on Jun. 26, 2018.

(30) Foreign Application Priority Data

Jun. 27, 2017   (DE) .................... 10 2017 210 785.5

(51) Int. Cl.
*H02K 1/20*      (2006.01)
*H02K 3/24*      (2006.01)
(Continued)

(52) U.S. Cl.
CPC ................. *H02K 1/20* (2013.01); *H02K 3/24* (2013.01); *H02K 3/30* (2013.01); *H02K 5/15* (2013.01)

(58) Field of Classification Search
CPC .. H02K 1/20; H02K 3/24; H02K 3/30; H02K 5/15; H02K 9/22; H02K 5/08; H02K 3/48
See application file for complete search history.

(56) References Cited

U.S. PATENT DOCUMENTS 5,214,325 A    5/1993  Matson et al.
6,731,028 B2   5/2004  Derleth et al.
(Continued)

FOREIGN PATENT DOCUMENTS

CN      101814797 A    8/2010
DE      10114321 A1    10/2002
(Continued)

*Primary Examiner* — Naishadh N Desai
(74) *Attorney, Agent, or Firm* — Falk Ewers; Ewers IP Law PLLC

(57) ABSTRACT

An electrical machine for a vehicle includes a rotor, which can be rotated about an axis of rotation, by which an axial direction of the electrical machine is defined, a stator with stator windings; and a cooling channel, or a plurality of cooling channels, through which a coolant flows. The stator has stator teeth, which extend along the axial direction and are spaced apart from each other along a circumferential direction and which bear the stator windings. At least one stator winding is embedded in an electrically insulating plastic for thermal coupling, the electrically insulating plastic is arranged, together with the at least one stator winding, in an intermediate space, which is formed between two stator teeth adjacent in the circumferential direction, and the electrically insulating plastic is formed by a first plastic mass of a first plastic material and a second plastic mass of a second plastic material.

30 Claims, 5 Drawing Sheets

(51) Int. Cl.
   *H02K 3/30* (2006.01)
   *H02K 5/15* (2006.01)

(56) References Cited

U.S. PATENT DOCUMENTS

| | | |
|---|---|---|
| 6,870,292 B2 | 3/2005 | Owada et al. |
| 7,514,826 B2 | 4/2009 | Wakita |
| 8,400,029 B2 | 3/2013 | Sugimoto et al. |
| 2003/0098630 A1 | 5/2003 | Owada et al. |
| 2006/0145548 A1* | 7/2006 | Wakita .................... H02K 3/24 310/54 |
| 2008/0136271 A1 | 6/2008 | Alfermann et al. |
| 2009/0022610 A1 | 1/2009 | Mateme et al. |
| 2009/0146513 A1 | 6/2009 | Bremner |
| 2011/0012474 A1* | 1/2011 | Levit ...................... B29B 17/02 310/214 |
| 2020/0032828 A1 | 1/2020 | Baur et al. |
| 2020/0161916 A1* | 5/2020 | Silva ........................ H02K 9/22 |
| 2020/0161917 A1* | 5/2020 | Silva ........................ H02K 3/30 |
| 2020/0185993 A1* | 6/2020 | Hoerz ...................... H02K 3/24 |
| 2020/0204023 A1* | 6/2020 | Hoerz ...................... H02K 9/22 |
| 2020/0204024 A1* | 6/2020 | Hoerz .................... H02K 9/197 |

FOREIGN PATENT DOCUMENTS

| | | |
|---|---|---|
| DE | 102006029803 A1 | 1/2008 |
| DE | 102008044168 A1 | 6/2009 |
| DE | 102014221204 A1 | 4/2016 |
| DE | 102014017745 A1 | 6/2016 |
| DE | 102015207865 A1 | 11/2016 |
| EP | 1317048 A2 | 6/2003 |
| EP | 1593191 A1 | 11/2005 |
| JP | S51043304 U | 3/1976 |
| JP | 10271738 A | 10/1998 |
| JP | 2003070199 A | 3/2003 |
| JP | 2003164088 A | 6/2003 |
| JP | 2004297924 A | 10/2004 |
| JP | 2010252491 A | 11/2010 |
| JP | 2011120402 A | 6/2011 |
| WO | 2004073144 A1 | 8/2004 |
| WO | 2011125145 A1 | 10/2011 |
| WO | 2013054479 A1 | 4/2013 |

\* cited by examiner

ELECTRICAL MACHINE, IN PARTICULAR FOR A VEHICLE

CROSS REFERENCE TO RELATED APPLICATIONS

This application is a continuation application of international patent application PCT/EP2018/067108, filed Jun. 26, 2018, designating the United States and claiming priority to German application DE 10 2017 210 785.5, filed Jun. 27, 2017, and the entire content of both applications is incorporated herein by reference.

TECHNICAL FIELD

The disclosure relates to an electrical machine, in particular for a vehicle, as well as to a vehicle including such a machine.

BACKGROUND

The electrical machine can generally be an electric motor or a generator. The electrical machine can be embodied as an external rotor or as an internal rotor.

A generic machine is known, for example, from U.S. Pat. No. 5,214,325. It includes a housing, which surrounds an internal space and which has a jacket, which revolves in a circumferential direction of the housing and which radially limits the internal space, a rear side wall axially limiting the internal space axially on one side, and a front side wall axially limiting the internal space axially on the other side. A stator of the machine is fixedly connected to the jacked. A rotor of the machine is arranged in the stator, wherein a rotor shaft of the rotor is rotatably supported on the front side wall via a front shaft bearing.

EP 1 317 048 A2 describes an electrical machine including a rotor and a stator, which has stator windings, and cooling ducts, through which a coolant can flow. The stator has stator teeth, which extend along an axial direction, which are arranged spaced apart from one another along a circumferential direction, which support the stator windings, and which form spaces, in which the cooling ducts, together with the stator windings, are arranged. The stator windings are embedded for the thermal coupling into a first plastic compound of a first plastic material and into a second plastic compound of a second plastic material.

EP 1 593 191 A1 describes an electrical machine including a rotor, a stator, which has stator windings, and a plurality of cooling ducts, through which a coolant can flow. The stator has stator teeth, which extend along the axial direction and which are arranged spaced apart from one another along a circumferential direction and which support the stator windings.

US 2009/022 610 A1 describes an electrical machine including a rotor, a stator, which has stator windings, and a plurality of cooling ducts, through which a coolant can flow. The stator has stator teeth, which extend along the axial direction and which are arranged spaced apart from one another along a circumferential direction and which support the stator windings.

JP H10 27 17 38 A describes an electrical machine, which includes a rotor and a stator including stator teeth, between which a stator winding and a cooling duct are arranged. The stator winding is thereby arranged at a first plastic compound and at a second plastic compound.

DE 10 2007 054 364 A1 describes an electrical machine including a stator core, which includes stator teeth and stator windings. The stator teeth are arranged at a distance from one another along a circumferential direction, support the stator windings, and protrude radially to the inside from the stator body. Two cooling ducts are arranged in the stator groove. The stator windings are arranged in an electrically insulating plastic of a first and second plastic compound.

DE 10 2012 217 711 A1 describes a stator for an electrical machine, which includes stator teeth and stator windings. The stator teeth are arranged at a distance from one another along a circumferential direction, support the stator windings, and protrude radially to the inside from the stator body. A cooling duct is arranged in the stator groove. The stator windings are embedded into an electrically insulating plastic.

JP 2004 297924 A describes an electrical machine, which includes a stator having stator windings and a rotor. A plastic compound and an insulating material are arranged with the stator winding in a space between two adjacent stator teeth of the stator. The stator winding and the cooling ducts are surrounded by the plastic compound, which, in turn, is surrounded by the insulating material. The surface sections of the stator limiting the space are at least partially coated with the insulating material.

The stator of a conventional electrical machine typically includes stator windings, which are electrically energized during operation of the machine. Heat is created thereby, which has to be dissipated in order to avoid an overheating and damages or even destruction of the stator associated therewith. For this purpose, it is known from conventional electrical machines to equip them with a cooling device for cooling the stator—in particular said stator windings. Such a cooling device includes one or a plurality of cooling ducts, through which a coolant flows and which are arranged in the stator in the vicinity of the stator windings. Heat can be dissipated from the stator by heat transfer from the stator windings to the coolant.

It proves to be disadvantageous thereby that an efficient heat transfer from the stator to the coolant, which flows through the respective cooling duct, is only associated with significant structural effort. This, however, has a disadvantageous effect on the production costs of the electrical machine.

SUMMARY

It is thus an object of the present disclosure to provide an improved embodiment for an electrical machine, in the case of which this disadvantage is largely or even completely eliminated. In particular an improved embodiment for an electrical machine is provided, which provides an improved cooling of the stator windings of the stator with simultaneously low production costs.

This object is achieved by an electrical machine and a vehicle as described herein.

A general idea of the disclosure is to embed the stator windings of an electrical machine into an electrically insulating plastic, which is formed by two different plastic compounds of different thermal conductivity for cooling the stator windings.

The plastic can thus act as a heat-transferring medium for transferring heat from the stator windings to the coolant on the one hand and as electrical insulator for the stator windings on the other hand. In particular a particularly good heat transfer between the stator windings and the coolant guided through the cooling duct is established in this way. With the use of an electrically insulating plastic, it is furthermore ensured that the stator windings to be cooled are not electrically short-circuited in an unwanted manner by the plastic.

The use of two plastic compounds of plastic materials of different thermal conductivity allows resorting to an expensive plastic material with high thermal conductivity in areas, in which a particularly high thermal conductivity is required for the heat dissipation. In contrast, a plastic—which can typically be obtained more cost-efficiently—can be resorted to in areas, in which no high thermal conductivity is required. As a result, this approach leads to significant cost advantages in the production of the electrical machine.

The direct thermal coupling of the cooling duct including the coolant to the stator windings to be cooled, with the help of the embedding of the stator winding(s) into an electrically insulating plastic, leads to a particularly effective cooling of the stator windings. In a high-load operation of the electrical machine, it can thus also be ensured that the arising waste heat can be dissipated from the stator. Damages to or even destruction of the electrical machine by overheating of the stator can thus be avoided.

The production of the electrically insulating plastic can typically take place by injection molding, in the case of which the stator windings to be cooled as well as optionally also the cooling duct are injection molded with the plastic for embodying the two plastic compounds. The embedding of the stator winding into the plastic compounds is thus very easy, even though two different plastic materials are used. This also results in cost advantages in the production of the electrical machine according to the disclosure. A further advantage of the solution proposed here is that the second plastic compound can act as additional electrical insulation between the stator windings and the stator body. In the event that—due to manufacturing—not all stator windings can be embedded completely into the first plastic compound, the second plastic compound prevents a possible electrical short-circuit with the electrically conductive material of the stator body in any event.

An electrical machine according to an aspect of the disclosure, in particular for a vehicle, includes a rotor, which can be rotated about an axis of rotation, by which, in turn, an axial direction of the electrical machine is defined. The machine furthermore includes a stator, which has stator windings. The stator has stator teeth, which extend along the axial direction and which are arranged spaced apart from one another along a circumferential direction, and which support the stator windings. The machine further includes at least one cooling duct, through which a coolant can flow, typically a plurality of such cooling ducts. At least one stator winding is embedded into an electrically insulating plastic for the thermal coupling. The electrically insulating plastic is thereby arranged with the at least one stator winding in at least one space, which is embodied between two stator teeth, which are adjacent in the circumferential direction. According to an aspect of the disclosure, the electrically insulating plastic is formed by a first plastic compound of a first plastic material, and by a second plastic compound of a second plastic material.

According to an aspect of the disclosure, the electrical machine incudes a coolant distributor chamber and a coolant collector chamber arranged axially at a distance therefrom. The coolant distributor chamber for cooling the stator windings thereby communicates fluidically with the coolant collector chamber by the at least one cooling duct, through which the coolant can flow. The coolant can be distributed effectively to the individual cooling ducts in this way. This also applies, when two or more cooling ducts are provided.

According to an aspect of the disclosure, at least one stator winding is embedded into the first plastic compound of the first plastic material in at least one space. The first plastic compound, with the stator winding embedded therein, is furthermore embedded into the second plastic compound of the second plastic material or is arranged in the second plastic compound or is at least partially or completely surrounded by it. This measure ensures a particularly good heat transfer between the stator windings and the cooling duct. In response to the production of the plastic compounds, said space between the stator teeth can furthermore be used in the manner of a casting mold, into which the two plastic compounds are injected. This simplifies the production of the plastic compounds, because the provision of a separate casting mold can be forgone.

According to an aspect of the disclosure, the surface sections of the stator, which limit the space, are coated with the first plastic compound. This measure ensures an improved electrical insulation of the stator windings with respect to the stator body.

According to an aspect of the disclosure, at least one cooling duct is arranged radially outside, and at least one further cooling duct is additionally arranged radially inside the respective stator winding in the space. In the case of this option, at least two cooling ducts are thus provided for the cooling of the stator winding, whereby an increased cooling power is effected.

According to an aspect of the disclosure, at least one cooling duct is embodied as tube body, which surrounds a tube body internal space. At least one separating element, which divides the tube body internal space into at least two partial cooling ducts, which are fluidically separated from one another, is thereby molded on the tube body. The tube body can be stiffened by said separating elements, so that its mechanical strength is increased. The tube body can be formed by an electrically conductive material, in particular a metal, or an electrically insulating material, in particular a plastic.

According to an aspect of the disclosure, the first or/and second plastic compound at least partially surrounds at least one winding section of the stator winding, which protrudes axially from the space, and thereby at least partially limits the coolant distributor chamber or/and the coolant collector chamber. During operation of the machine, this winding section is thus electrically insulated with respect to the coolant. An unwanted electrical connection of the winding section of the stator winding to the coolant, which flows through the cooling duct, can be avoided in this way.

According to an exemplary embodiment, the thermal conductivity of the first plastic material is larger than the thermal conductivity of the second plastic material. Alternatively, the thermal conductivity of the first plastic material can be smaller than the thermal conductivity of the second plastic material. Alternatively to these two options, it is also conceivable, however, that the thermal conductivity of the first plastic material is identical to the thermal conductivity of the second plastic material.

The coolant distributor chamber and/or coolant collector chamber can be exclusively arranged in an axial extension of the stator adjacent to the latter. Along a radial direction or stator, respectively, the coolant distributor chamber or the coolant collector chamber, respectively, typically do not protrude beyond said stator. This option requires very little installation space.

The first and second plastic compound can be arranged in at least two spaces, typically in all spaces.

Advantageously, the first plastic material includes a thermoset or is a thermoset. Alternatively or additionally, the second plastic material can include a thermoplastic or can be a thermoplastic. Reduced production costs are associated with the use of a thermoset with reduced thermal conductivity in those areas, which are to be considered to be less critical with regard to heat transfer.

In an alternative option, it is also conceivable that the first plastic material includes a thermoplastic or is a thermoplastic and that the second plastic material includes a thermoset or is a thermoset.

In the case of a further exemplary embodiment, at least one cooling duct is arranged in the plastic compound. This measure ensures a particularly effective heat transfer between the stator windings and the cooling duct, because the cooling duct, which is arranged in the space, is in the immediate vicinity of the stator windings to be cooled.

In the case of a further exemplary embodiment, the at least one cooling duct is formed by at least one, typically by a plurality of aperture/apertures, which is/are provided in the plastic compound and through which the coolant can flow. This option can be realized particularly easily and is thus particularly cost-efficient.

The second plastic compound can completely surround or encase at least one aperture, typically all apertures, in a cross-section perpendicular to the axial direction. The aperture forming the cooling duct can be thermally coupled to the stator windings particularly well in this way.

Advantageously, at least one aperture can have the geometry of a rectangle including two broad sides and two narrow sides in a cross-section perpendicular to the axial direction. In this way, the aperture is given the advantageous geometry of a flat tube, which, in turn, allows for an installation space-saving arrangement of the cooling duct in the immediate vicinity of the stator winding(s) to be cooled.

The at least one cooling duct is typically encased or surrounded by the second plastic compound. A particularly good thermal connection of the coolant, which flows through the cooling duct, to the stator winding is ensured in this way.

According to an exemplary embodiment, the coolant distributor chamber and/or the coolant collector chamber are at least partially arranged in the electrically insulating plastic, typically in the first plastic compound, for thermally coupling to the stator windings. This provides for a particularly good heat transfer between the coolant distributor chamber or coolant collector chamber, respectively, and the stator windings, so that the coolant distributor chamber or coolant collector chamber, respectively, can also be used for the direct absorption of waste heat from the stator windings.

According to another exemplary embodiment, the coating of the second plastic compound extends at least over a total length of the respective space, measured along the axial direction, and electrically insulates the respective stator winding or/and the first plastic compound from the stator, in particular from the respective stator tooth. A complete electrical insulation is ensured along the axial direction in this way.

According to an aspect of the disclosure, the coating of the second plastic compound encloses the respective stator winding inside the space over at least the entire length of the respective space, measured along the axial direction, in a U-shaped manner in the circumferential direction. A complete electrical insulation is ensured along the axial direction in this way.

According to an aspect of the disclosure, the first and the second plastic compound together fill the at least one space essentially completely. Unwanted spaces, for instance in the manner of air gaps, which would lead to an unwanted reduction of the heat transfer, are avoided in this way.

In the case of another exemplary embodiment, the first and the second plastic compound are in each case an injection molding compound of the first or second plastic material, respectively. The use of an injection molding method simplifies and accelerates the production of the plastic compounds. This leads to cost advantages in the production of the electrical machine.

In the case of an advantageous further development, the stator includes a typically ring-shaped stator body, from which the stator teeth can protrude. In the case of this further development, the first plastic compound is arranged at least on an outer circumferential side of the stator body. The stator can be electrically insulated against the surrounding area of the electrical machine in this way. The provision of a separate housing for accommodating the stator body can thus be forgone. A coating of at least one or of both front sides of the stator body with the plastic compound is also conceivable in an optional option. In a further option, the plastic compound can encase the stator body, typically completely. According to an aspect of the disclosure, the first plastic compound forms an outer coating on the outer circumferential side. The stator body is electrically insulated on the outer circumferential side in this way.

Advantageously, the first plastic compound protrudes axially, typically on both sides, from the respective space. The first plastic compound can thus also be used to partially limit the coolant distributor chamber or the coolant collector chamber, respectively. A removal of the portion of the first plastic compound protruding from the space, which is required as part of the production of the machine, can in particular be forgone, which is associated with cost advantages in the production of the machine.

According to a further exemplary embodiment, the first plastic compound at least partially limits the coolant distributor chamber and/or the coolant collector chamber. The provision of a separate limitation for the coolant distributor chamber or the coolant collector chamber, respectively, for instance in the form of a housing, can be forgone in the case of this option.

At least one cooling duct as well as the first and second plastic compound can in each case be provided in at least one, typically in each space, between two stator teeth, which are in each case adjacent in the circumferential direction. It is ensured in this way that operationally generated waste heat can be dissipated from all of the stator windings, which are present.

According to another exemplary embodiment, the at least one cooling duct is arranged radially outside or radially inside the respective stator winding in the space. This provides for an installation space-efficient arrangement of the cooling duct close to the stator windings to be cooled, so that the electrical machine requires only little installation space for the cooling of the stator windings.

According to an exemplary embodiment, at least one tube body, typically all tube bodies, are electrically insulated from the stator body, in particular from the stator teeth, by the first or/and second plastic compound. An unwanted electrical connection of the stator body or of the stator teeth, respectively, to the tube body can be avoided in this way.

According to an aspect of the disclosure, the tube body is embodied as a flat tube, which extends along the axial direction and which has two broad sides and two narrow sides in a cross section perpendicular to the axial direction. In the cross-section perpendicular to the axial direction, at least one broad side of the flat tube advantageously extends essentially perpendicular to the radial direction. A length of the two broad sides can thereby typically be at least four times, typically at least ten times, a length of the two narrow sides.

According to an exemplary embodiment, the at least one stator winding is electrically insulated from the cooling duct, which is embodied as tube body, by the first and/or second plastic compound. An unwanted electrical connection of the stator winding to the coolant, which flows through the cooling duct, can be avoided in this way.

According to an aspect of the disclosure, at least one stator winding is embodied in such a way that it is electrically insulated, typically completely, from the coolant and from the stator body at least in the area inside the respective space during operation of the electrical machine by the first or/and second plastic compound. An unwanted electrical connection of the winding section of the stator winding to the coolant, which flows through the cooling duct, can be avoided in this way.

According to a further exemplary embodiment, at least one cooling duct is arranged in the stator body and is formed by at least one aperture, through which the coolant can flow. Said aperture can be realized in the form of a through bore, which is introduced into the stator body by a suitable drilling tool in the course of the production of the electrical machine. The provision of a separate tube body or the like for limiting the cooling duct can be forgone in the case of this option. This is associated with reduced production costs. According to an aspect of the disclosure, a plurality of such apertures is provided. The aperture is partially, particularly typically completely, limited, encased and/or surrounded by the electrically insulating plastic, most typically by the second plastic compound. An unwanted electrical short-circuit of the coolant, which flows through the aperture, with the stator body can be avoided in this way.

In the case of a further exemplary embodiment, the aperture forming the cooling duct is embodied to be open towards the space. Said aperture is thereby closed in a fluid-tight manner by the electrically insulating plastic, typically by the second plastic compound, which is arranged in the space. In the case of this option, the apertures can be produced particularly easily, which is associated with cost advantages in the production.

According to an aspect of the disclosure, the at least one cooling duct is arranged in the stator body in the area between two adjacent stator teeth with respect to the circumferential direction. This makes it possible to arrange the cooling duct close to the stator windings to be cooled, which improves the heat transfer from the stator windings to the cooling duct. This option additionally turns out to be particularly compact.

According to a further exemplary embodiment, the coolant distributor chamber and/or the coolant collector chamber are formed by a hollow space, which is at least partially, typically completely, present in the first plastic compound. The provision of a separate casing or of a housing, respectively, for limiting the coolant distributor or coolant collector chamber, respectively, can thus be forgone. This exemplary embodiment is also associated with significant cost advantages.

According to an aspect of the disclosure, at least two cooling ducts, typically all available cooling ducts, are embodied in such a way that, during operation of the machine, coolant guided through these cooling ducts flows from a first axial end section of the stator, typically of the stator body, in the direction of a second axial end section of the stator or stator body, respectively. A reverse flow-through of these cooling ducts, or vice versa, also from the second axial end section to the first axial end section, is also conceivable. In the case of this option, the coolant is not guided through the cooling ducts in the counter flow with respect to the axial direction. This simplifies the arrangement of the cooling ducts in the machine.

According to an aspect of the disclosure, the stator windings are part of a distributed winding.

The disclosure further relates to a vehicle, in particular a motor vehicle, including an above-presented electrical machine. The above-described advantages of the electrical machine can thus also be transferred to the vehicle according to an aspect of the disclosure.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
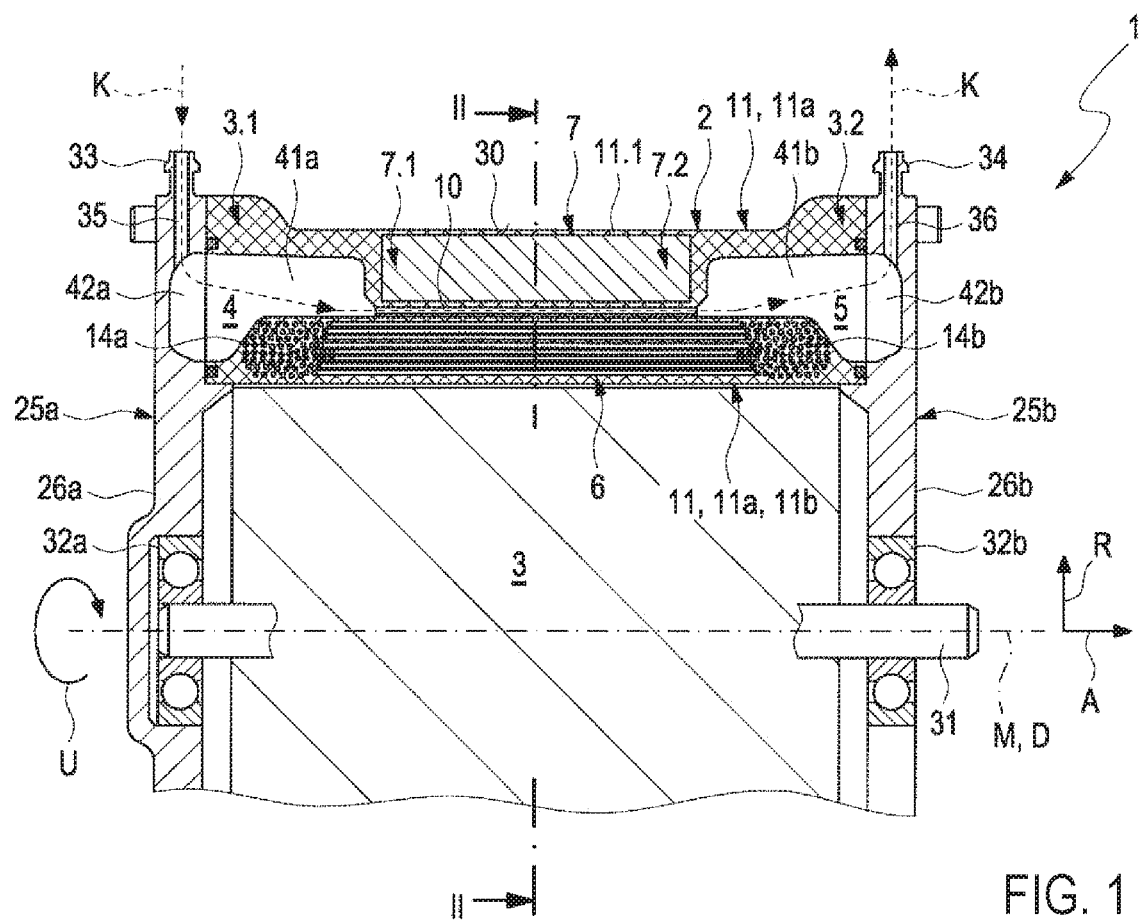
FIG. 1 shows an electrical machine in a longitudinal section along the axis of rotation of the rotor according to an exemplary embodiment of the disclosure.
Figure 2:
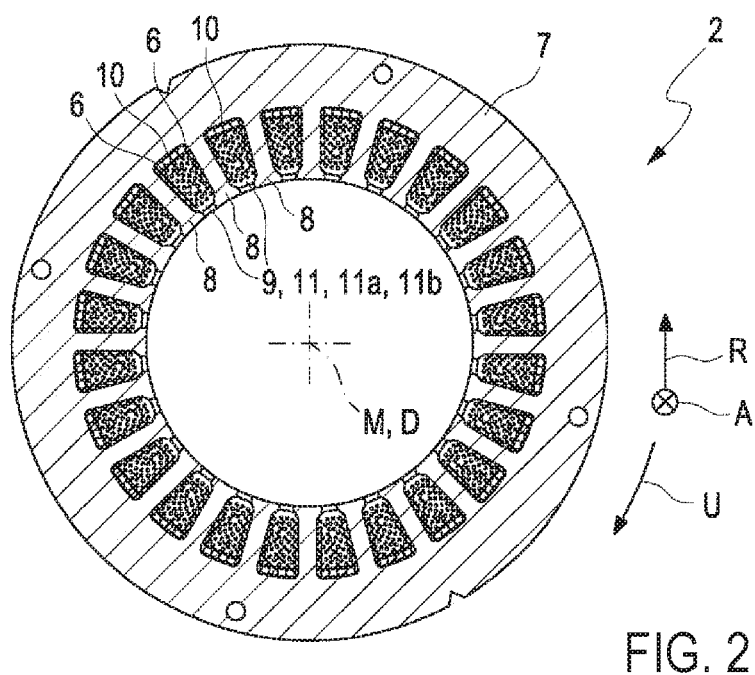
FIG. 2 shows the stator of the electrical machine shown in FIG. 1 in a cross-section view perpendicular to the axis of rotation of the rotor.

FIG. 1 shows an electrical machine 1 according to an exemplary embodiment of the disclosure in a sectional illustration. The electrical machine 1 is dimensioned in such a way that it can be used in a vehicle, typically in a road vehicle. The electrical machine 1 includes a rotor 3, which is only illustrated in a roughly schematic manner in FIG. 1, and a stator 2. For clarification purposes, the stator 2 is illustrated in FIG. 2 in a cross-section perpendicular to the axis of rotation D along the sectional line II-II of FIG. 1 in a separate illustration. According to FIG. 1, the rotor 3 has a rotor shaft 31 and can have a plurality of magnets, which are not illustrated in more detail in FIG. 1, the magnetic polarization of which alternates along the circumferential direction U. The rotor 3 can be rotated about an axis of rotation D, the position of which is determined by the center longitudinal axis M of the rotor shaft 31. The axis of rotation D defines an axial direction A, which extends parallel to the axis of rotation D. A radial direction R is perpendicular to the axial direction A. A circumferential direction U rotates around the axis of rotation D.

As can be seen in FIG. 1, the rotor 3 is arranged in the stator 2. The electrical machine 1 shown here is thus a so-called internal rotor. However, a realization as a so-called external rotor is also conceivable, in the case of which the rotor 3 is arranged outside of the stator 2. The rotor shaft 31 is supported on the stator 2 in a first shaft bearing 32a and, axially spaced apart therefrom, in a second shaft bearing 32b so as to be rotatable around the axis of rotation D.

In the known manner, the stator 2 furthermore includes a plurality of stator windings 6, which can be electrically energized so as to generate a magnetic field. The rotor 3 is set into rotation by magnetic interaction of the magnetic field, which is generated by the magnets of the rotor 3, with the magnetic field, which is generated by the electrically conductive stator windings 6.

It can be gathered from the cross section of FIG. 2 that the stator 2 can have a ring-shaped stator body 7, for example of iron. The stator body 7 can in particular be formed of a plurality of stator body plates (not shown), which are stacked on top of one another along the axial direction A and which are adhered to one another. A plurality of stator teeth 8, which extend along the axial direction A, protrude away from the stator body 7 radially to the inside, and which are arranged spaced apart from one another along the circumferential direction U, are molded on the stator body 7 radially on the inside. Each stator tooth 8 supports a stator winding 6. Together, the individual stator windings 6 form a winding arrangement. Depending on the number of the magnetic poles, which are to be formed by the stator windings 6, the individual stator windings 6 of the entire winding arrangement can be electrically wired together in a suitable manner.

During operation of the machine 1, the electrically energized stator windings 6 generate waste heat, which has to be dissipated from the machine 1, in order to prevent an overheating and damages to or even destruction of the machine 1 associated therewith. The stator windings 6 are thus cooled with the help of a coolant K, which is guided through the stator 2 and which absorbs the waste heat generated by the stator windings 6 by heat transfer.

To guide the coolant K through the stator 2, the machine 1 includes a coolant distributor chamber 4, into which a coolant K can be introduced via a coolant inlet 33. Along the axial direction A, a coolant collector chamber 5 is arranged at a distance from the coolant distributor 4. The coolant distributor chamber 4 communicates fluidically with the coolant collector chamber 5 by a plurality of cooling ducts 10, of which only a single one can be seen in the illustration of FIG. 1. In a cross-section perpendicular to the axial direction A, which is not shown in the figures, the coolant distributor chamber 4 and the coolant collector chamber 5 can each have a ring-shaped geometry. A plurality of cooling ducts 10, which each extend along the axial direction A from the ring-shaped coolant distributor chamber 4 to the ring-shaped coolant collector chamber 5, are arranged at a distance from one another along the circumferential direction U. The coolant K introduced into the coolant distributor chamber 4 via the coolant inlet 33 can thus be distributed to the individual cooling ducts 10. After the flow-through of the cooling ducts 10 and the absorption of heat from the stator windings, the coolant K is collected in the coolant collector chamber 5 and is discharged from the machine 1 again via a coolant outlet 34 provided on the stator 2.

In the exemplary embodiment shown in the figures, the cooling ducts 10 are thus embodied in such a way that the coolant K, which is guided through these cooling ducts 10 during operation of the machine 1, flows from a first axial end section 3.1, 7.1 of the stator 2 or of the stator body 7, respectively, in the direction of a second axial end section 3.2, 7.2 of the stator 3 or of the stator body 7, respectively.

As can be seen in the illustrations of FIGS. 1 and 2, the stator windings 6 are arranged in spaces 9, which are in each case embodied between two stator teeth 8, which are adjacent in the circumferential direction U. Said spaces 9 are also known to a person of ordinary skill in the art as so-called "stator grooves" or "stator slots", which extend along the axial direction A, as do the stator teeth 8.

Reference will now be made to the illustration of FIG. 3, which shows a space 9 of an electrical machine, which is not in accordance with the disclosure, embodied between two stator teeth 8—hereinafter also referred to as stator teeth 8a, 8b—which are adjacent in the circumferential direction U, in a detail illustration. To improve the heat transfer of the waste heat generated by the stator windings 6 to the coolant K flowing through the cooling ducts 10, an electrically insulating plastic 11 is in each case provided in the spaces 9 in accordance with FIG. 3. The electrically insulating plastic compound 11 is formed by a first plastic compound 11a of a first plastic material and by a second plastic compound 11b of a second plastic material, the thermal conductivity of which is larger than the thermal conductivity of the first plastic material. The first plastic material 11a is a thermoset. The second plastic material 11b is a thermoplastic. In the exemplary embodiment, a first and a second plastic compound 11a and 11b are in each case arranged in all spaces 9. In an option of the example, the thermal conductivity of the first plastic material can be smaller than or equal to the thermal conductivity of the second plastic material. The two plastic compounds 11a and 11b are typically in each case injection molding compounds of the electrically insulating plastic 11. The use of an injection molding method simplifies and accelerates the production of the plastic compound.

The surface sections of the stator 2, which limit the space 9, are typically coated completely with the second plastic compound 11b. The coating of the second plastic compound 11b can extend at least over a total length of the respective space 9, measured along the axial direction A, and can electrically insulate the respective stator winding 6 or/and the first plastic compound 11a from the stator 2, in particular from the respective stator tooth 7, in this way. The coating of the second plastic compound 11b can in particular enclose the respective stator winding 6 inside the space 9 over at least the entire length of the respective space 9, measured along the axial direction A, in a U-shaped manner in the circumferential direction.

The stator windings 6 are in each case embodied in such a way that they are electrically insulated, typically completely, from the coolant K and also from the stator body 7 at least in the area inside the respective space 9 during operation of the electrical machine 1 by the first and/or second plastic compound 11a, 11b.

The first as well as the second plastic compound 11a and 11b can at least partially surround a winding section of the stator winding 6, which protrudes axially from the space 9, and can furthermore partially limit the coolant distributor chamber 4 as well as the coolant collector chamber 5. Said winding section is electrically insulated with respect to the coolant K during operation of the electrical machine 1 in this way.

Figure 3:
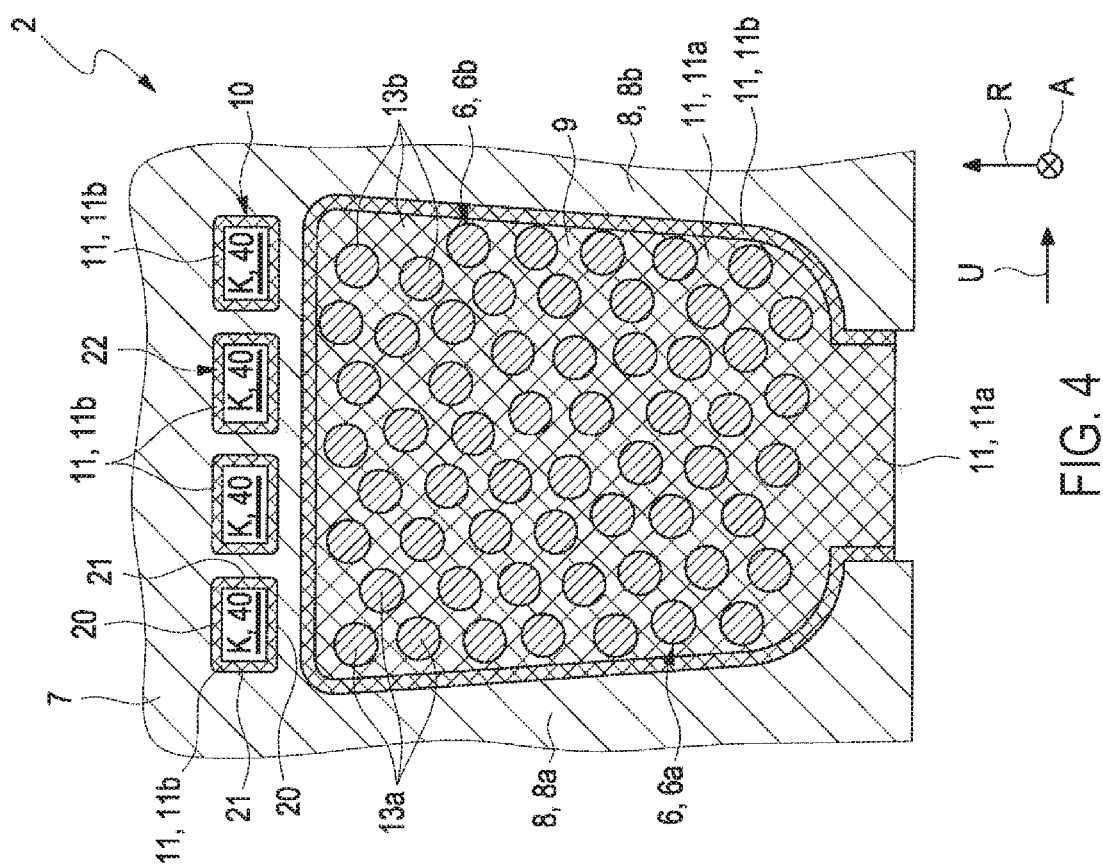
FIG. 3 shows a detailed illustration of the stator shown in FIG. 2 in the area of a space of an electrical machine between two stator teeth, which are adjacent in the circumferential direction.

As shown in FIG. 3, the stator windings 6 arranged in the space 9 and a coolant 10 are embedded into the first plastic compound 11a of the first plastic material. The first plastic compound 11a including the stator winding 6 embedded therein and a cooling duct 10 are embedded, in turn, into the second plastic compound 11b of the second plastic material or are partially surrounded by it, respectively.

It goes without saying that the stator winding 6, which is arranged in the space 9 as shown in FIG. 3, in each case partially belongs to a first stator winding 6a, which is supported by a first stator tooth 8a, and which is partially assigned to a second stator winding 6b, which is supported by a second stator tooth 8b, which is adjacent to the first stator tooth 8a in the circumferential direction U. To clarify this scenario, a possible virtual separating line 12 is delineated in FIG. 3. The winding wires 13a shown to the left of the separating line 12 in FIG. 3 belong to the stator winding 6a, which is supported by the stator tooth 8a. The winding wires 13b shown to the right of the separating line 12 belong to the stator winding 6b, which is supported by the stator tooth 8b.

As shown in FIG. 3, the cooling duct 10, which is embodied in the space 9, is realized by a plurality of apertures 40, which are arranged in the electrically insulating plastic 11 and through which the coolant K can flow. In the cross-section perpendicular to the axial direction A shown in FIG. 3, the second plastic compound 11b in each case typically surrounds the apertures 40 completely. The apertures 40 forming the cooling duct 10 can be thermally coupled to the stator windings 6 particularly effectively in this way.

The apertures 40—four of such apertures 40 are shown merely in an exemplary manner in FIG. 3—are arranged spaced apart from one another along the circumferential direction U and each extend along the axial direction A. The apertures 40 can be realized as through bores, which are introduced into the plastic compound 11 by a suitable drilling tool. The apertures 40 can each have the geometry of a rectangle including two broad sides 20 and including two narrow sides 21 in the cross-section perpendicular to the axis of rotation D. A length of the two broad sides 20 is thereby at least twice, typically at least four times, a length of the two narrow sides 21. The advantageous geometry of a flat tube is thus simulated.

Advantageously, the tube bodies 16 are in each case electrically insulated from the stator body 7 and thereby in particular from the stator teeth 8 thereof by the first as well as second plastic compound 11a and 11b. The respective stator winding 6 is electrically insulated from the cooling duct 10, which is embodied as tube body 16, by the first or second plastic compound 11a and 11b, respectively.

In the exemplary embodiment shown in FIG. 3, the apertures 40 forming the cooling duct 10 are arranged in the plastic compound 11 radially outside of the stator windings 6 with respect to the radial direction R. The radial distance of the cooling duct 10 to the axis of rotation D of the rotor 3 is thus larger than the distance of the stator winding 6 to the axis of rotation D. However, an arrangement of the cooling ducts 10 radially on the inside is also conceivable. In the cross-section perpendicular to the axial direction A shown in FIG. 3, the two broad sides 20 of the apertures 40 each extend perpendicular to the radial direction R.

To produce an electrical machine 1 according to FIGS. 1 to 3, the surfaces of the stator body 7, which limit the spaces 9, are injection molded with the second plastic material, typically a thermoplastic, and the second plastic compound 11b is formed in this way. The material of the stator body 7 is thereby electrically insulated towards the respective space 9. The stator windings 6 are then introduced into the spaces 9 and are arranged on the stator teeth 8. The stator windings 6 are then injection molded with the first plastic material, typically a thermoset, which results in the first plastic compound 11a. As part of the production of the electrically insulating plastic 11, which consists of the two plastic compounds 11a and 11b, the stator body 7 can also be injection molded with the first plastic material, which forms the first plastic compound 11a. Before or after, the apertures 40, which form the cooling duct 10, can be introduced into the second plastic compound 11b with the help of a suitable drilling tool.

Figure 4:
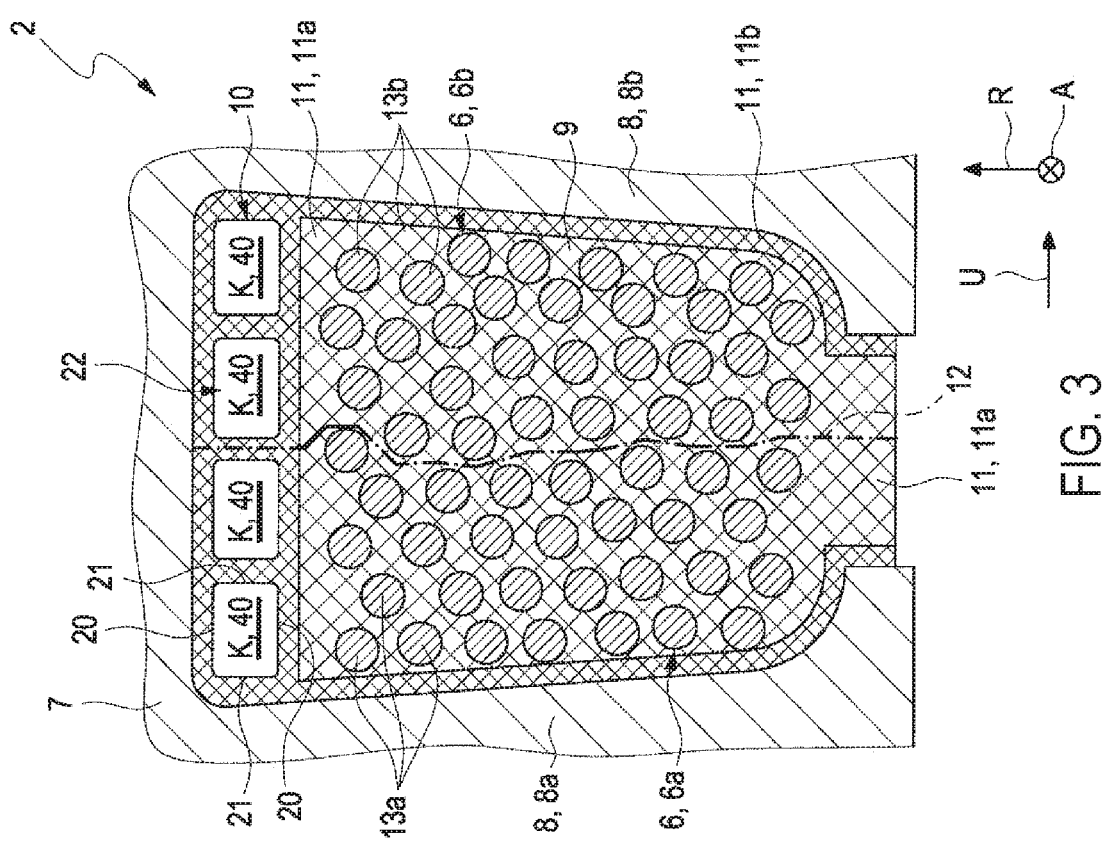
FIGS. 4 and 5 show variations of the exemplary embodiment shown in FIG. 3, which are not in accordance with the disclosure.

FIG. 4 shows a variation of the exemplary embodiment shown in FIG. 3 which is not in accordance with the disclosure. In the case of the machine 1 according to FIG. 4, the cooling duct 10 is not arranged in the first plastic compound 11a, but in the stator body 7 of the stator 2. As can be seen in FIG. 4, the apertures 40 forming the cooling duct 10 are arranged in the stator body 7 radially outside the space 9 and between two adjacent stator teeth 8a and 8b with respect to the circumferential direction U. Analogously to the exemplary embodiment shown in FIG. 3, the cooling duct 10 is formed by apertures 40, which, however, in the case of the variation shown in FIG. 4, are arranged in the stator body 7—and not in the plastic 11. The cooling duct 10 can be formed—typically in the course of the production of the stator body 7—by introducing the apertures 40 into the stator body 7 or into the stator body plates forming the stator body 7, respectively, typically in the form of bores with the help of a suitable drilling tool.

The aperture 40 embodied in the stator body 7 is thereby limited, encased or/and surrounded typically completely by the electrically insulating plastic 11, in particular by the second plastic compound 11b. An unwanted electrical short-circuit of the coolant K, which flows through the aperture 40, with the stator body 7 can be avoided in this way.

Figure 5:
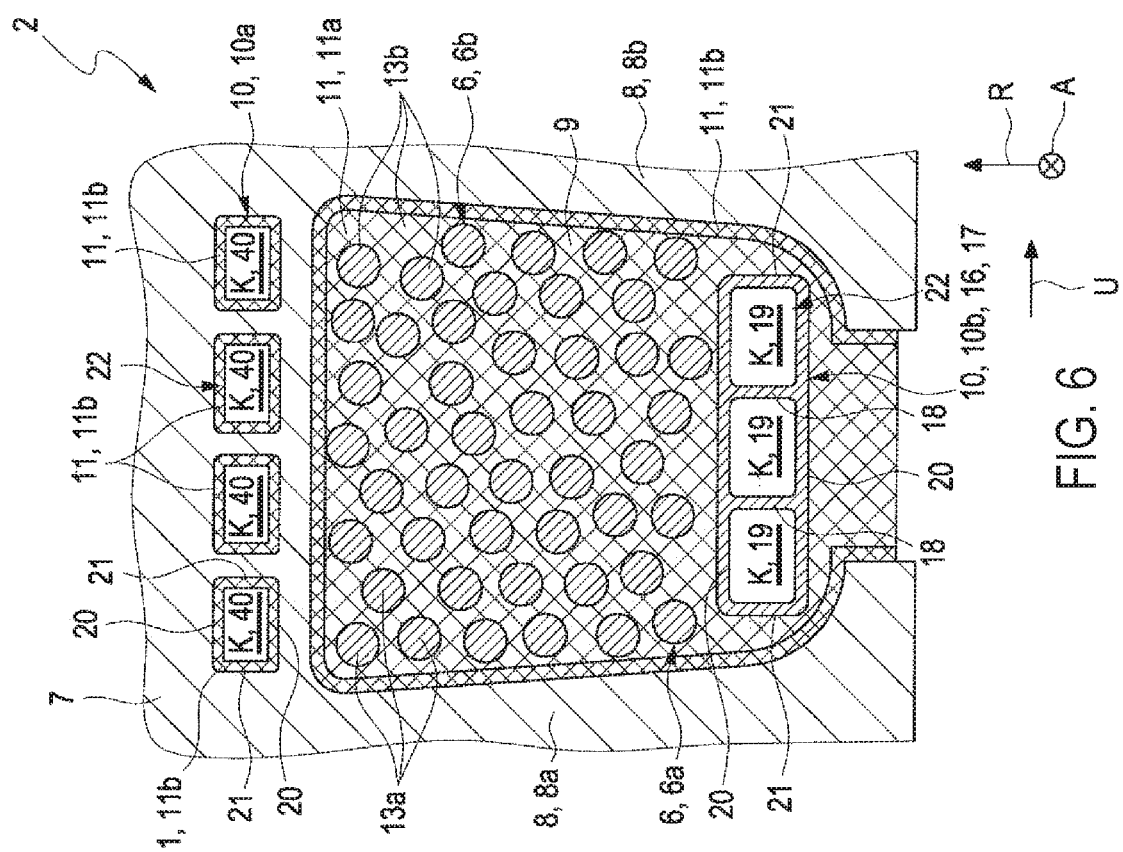

FIG. 5 shows a variation of the example shown in FIG. 4, which is not in accordance with the disclosure. In the case of the variation shown in FIG. 5, the apertures 40 forming the cooling duct 10 are also arranged in the stator body 7 of the stator 2. However, in the variation shown in FIG. 5—contrary to the variation shown in FIG. 4—the apertures 40 arranged in the stator body 7 are embodied so as to be open towards the space 9. As can be seen in FIG. 5, the apertures 40 are closed in a fluid-tight manner towards the space 9 and by the second plastic compound 11b provided in the space 9.

Figure 6:
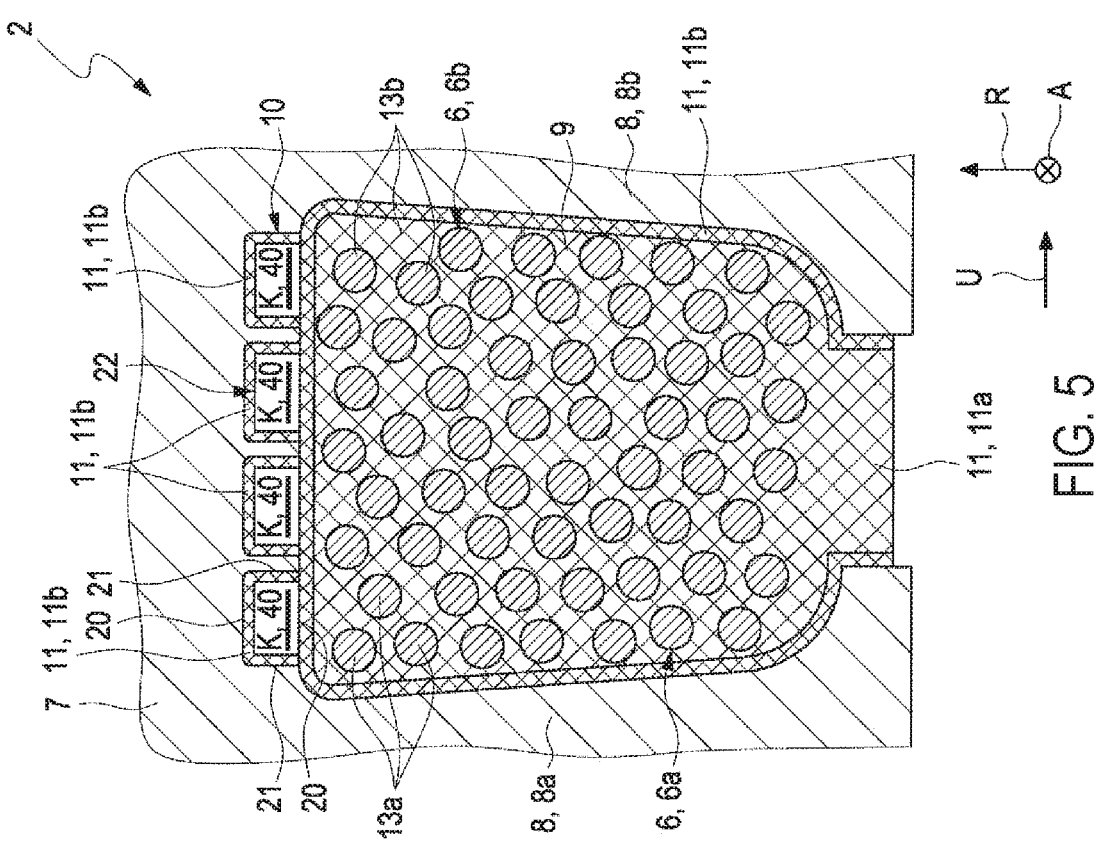
FIG. 6 shows a variation of the exemplary embodiment shown in FIG. 5.

FIG. 6 shows a further variation of the example shown FIG. 5 according to a further exemplary embodiment of the disclosure. In the case of the further exemplary embodiment shown in FIG. 6, a cooling duct 10 is embodied in the stator body 7 as well as in the first plastic compound 11a. The cooling duct 10 additionally provided in the stator body 7—hereinafter also referred to as "radially outer cooling duct" 10a—is embodied analogously to the example of FIG. 5, so that reference is made to the above description relating to FIG. 5. The cooling duct 10 arranged in the first plastic compound 11a will also be referred to hereinafter as "radially inner cooling duct" 10b. With respect to the radial direction R, the stator winding 6 is thus arranged between the two cooling ducts 10a and 10b. As shown by the detail illustration of FIG. 6, the radially inner cooling duct 10b can be formed by a tube body 16, for example of aluminum, which surrounds a tube body internal space 22. An electrically conductive material, in particular a metal, or an electrically insulating material, in particular a plastic, is generally possible as material for the tube body 16 or the cooling duct 10 and 10a, respectively. As shown in the detail illustration of FIG. 6, one or a plurality of separating elements 18, which divide the cooling duct 10b into partial cooling ducts 19, which are fluidically separated from one another, can optionally be molded on the tube body 16. The flow behavior of the coolant K in the cooling duct 10b can be improved in this way, which is associated with an improved heat transfer to the coolant. The tube body 16 is furthermore additionally stiffened mechanically. In the exemplary embodiment shown in FIG. 6, two such separating elements 18 are illustrated in an exemplary manner, so that three partial cooling ducts 19 result. It goes without saying that a different number of separating elements 18 is also possible in variations of the exemplary embodiment. The tube body 16 can be embodied as flat tube 17, which has two broad sides 20 and two narrow sides 21 in the cross-section perpendicular to the axial direction A. A length of the two broad sides 20 is at least four times, typically at least ten times, a length of the two narrow sides 21 in this case. The broad sides 20 extend perpendicular to the radial direction R.

The above-discussed variations according to FIGS. 3 to 6 can be combined with one another, where useful.

Reference will be made again below to FIG. 1. As clearly shown in FIG. 1, the first plastic compound 11a, which is typically embodied in one piece, can axially protrude from the spaces 9 on both sides. This allows to also embed the coolant distributor chamber 4 as well as, alternatively or additionally, the coolant collector chamber 5 into the first plastic compound 11a, which is arranged axially outside of the respective space 9, for the thermal coupling to the two axial end sections 14a and 14b of the respective stator winding 6. An effective heat transfer with the coolant K, which is present in the coolant distributor chamber 4 or coolant collector chamber 5, respectively, can also be established in this way in the area of the axial end sections 14a and 14b of the respective stator winding 6, which are usually thermally loaded in a particular manner. This measure allows for a particularly effective cooling of the two axial end sections 14a and 14b of the stator winding 6.

As shown in FIG. 1, the stator 2 including the stator body 7 and the stator teeth 8 is further axially arranged between a first and a second bearing shield 25a and 25b.

As can be seen in FIG. 1, a portion of the coolant distributor chamber 4 is arranged in the first bearing shield 25a and a portion of the coolant collector chamber 5 in the second bearing shield 25b. The coolant distributor chamber 4 and the coolant collector chamber 5 are thus each partially formed by a hollow space 41a and 41b, which is provided in the first plastic compound 11a.

The first hollow space 41a is thereby supplemented with a hollow space 42a embodied in the first bearing shield 25a to form the coolant distributor chamber 4. The second hollow space 41b is accordingly supplemented with a hollow space 42b embodied in the second bearing shield 25b to form the coolant collector chamber 5. In the case of the above-described exemplary embodiments, the first plastic compound 11a thus at least partially limits the coolant distributor chamber 4 as well as the coolant collector chamber 5.

A coolant supply 35, which fluidically connects the coolant distributor chamber 4 to a coolant inlet 33, which is provided on the first bearing shield 25a on the outside, in particular circumferentially as illustrated in FIG. 1, can further be embodied in the first bearing shield 25a. A coolant discharge 36, which fluidically connects the coolant collector chamber 5 to a coolant outlet 34, which is provided on the bearing shield 25b on the outside, in particular circumferentially as illustrated in FIG. 1, can accordingly be embodied in the second bearing shield 25b. This provides for an arrangement of the coolant distributor chamber 4 or of the coolant collector chamber 5, respectively, radially on the outside of the first or second end section 14a and 14b, respectively, of the respective stator winding 6 and also in the extension of these end sections 14a and 14b along the axial direction A. The end sections 14a and 14b of the stator windings 6, which are particularly loaded thermally during operation of the machine 1, are cooled particularly effectively by this measure.

As shown in FIG. 1, the first plastic compound 11a of the electrically insulating plastic can also be arranged on an outer circumferential side 30 of the stator body 7 and can thus embody a plastic coating 11.1 on the outer circumferential side 30. The stator body 7 of the stator 2, which is typically formed of electrically conductive stator plates, can thus be electrically insulated against the surrounding area. The provision of a separate housing for accommodating the stator body 7 can thus be foregone.

Figure 7:
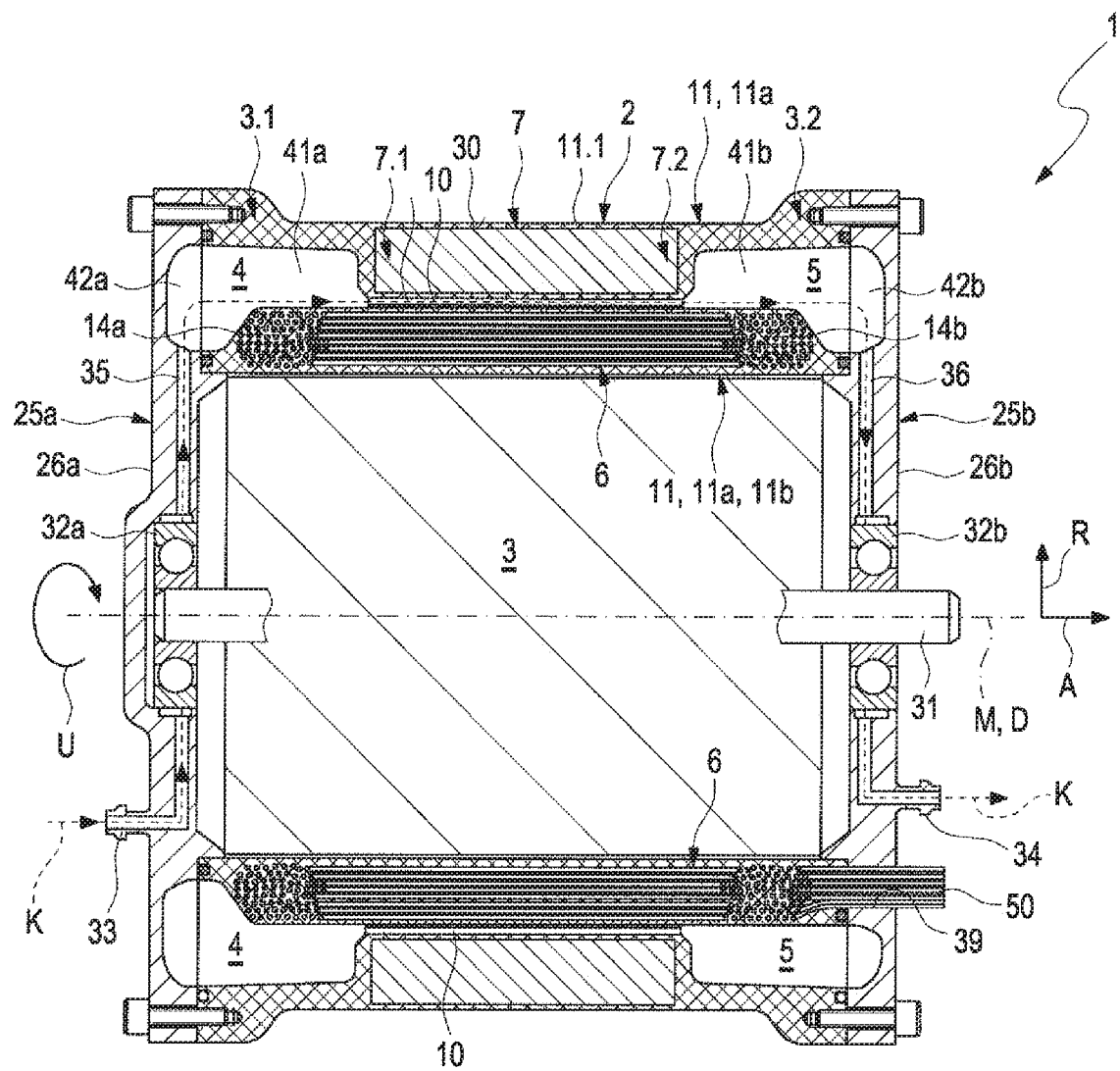
FIG. 7 shows a first variation of the electrical machine shown in FIG. 1, in the case of which the coolant flowing through the cooling ducts is also used to cool the shaft bearings of the rotor.

FIG. 7 shows a variation of the exemplary embodiment shown in FIG. 1. To also cool the rotor shaft 31 as well as the two shaft bearings 32a and 32b during operation of the machine 1, the coolant supply 35 can be thermally coupled to the first shaft bearing 32a, which is arranged in the first bearing shield 25a. The coolant discharge 36 can likewise be thermally coupled to the second shaft bearing 32b, which is arranged in the second bearing shield 25b. A separate cooling device for cooling the shaft bearings 32a and 32b can be forgone in this way, which results in cost advantages. In the exemplary embodiment shown in FIG. 7, the coolant inlet 33 and the coolant outlet 34 are provided at the outer front side 26a and 26b of the respective bearing shield 25a and 25b. In the exemplary embodiment shown FIGS. 7 and 1, the stator windings 6 are arranged radially inside the cooling ducts 10 along the radial direction R. The stator windings 6 are guided out of the stator 2 to the outside by an electrical connection 50 through a feedthrough 39 provided in the second bearing shield 25b, so that they can be electrically energized from the outside. The feedthrough 39 is arranged radially between the coolant distributor chamber 4 or the coolant collector chamber 5, respectively, and the axis of rotation D.

Figure 8:
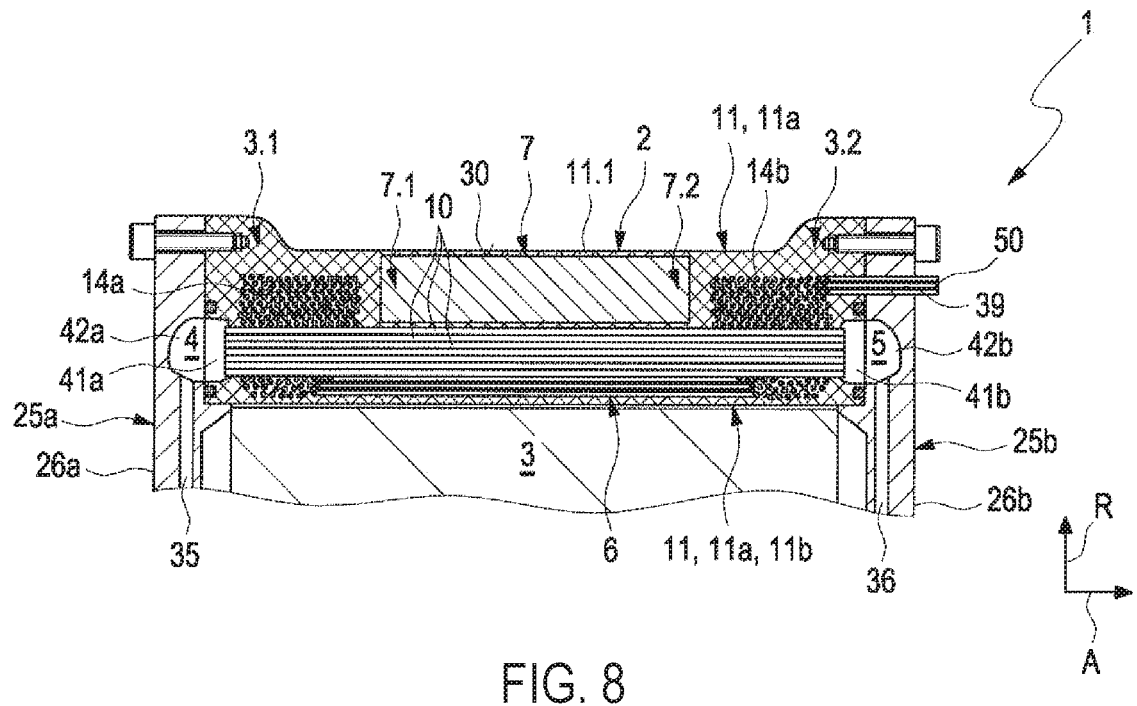
FIG. 8 shows a second variation of the electrical machine shown in FIG. 1, which requires particularly little installation space.

In the exemplary embodiment shown in FIG. 8, which shows a simplified exemplary embodiment as compared to FIG. 7, the coolant distributor chamber 4 and the coolant collector chamber 5 are arranged exclusively in the axial extension of the cooling ducts 10. This exemplary embodiment requires particularly little installation space for the coolant distributor chamber 4 and for the coolant collector chamber 5. In the case of the exemplary embodiment shown in FIG. 8, the stator windings 6 are arranged radially inside the cooling ducts 10 along the radial direction R. The stator windings 6 are guided out of the stator 2 to the outside by an electrical connection 50 through a feedthrough 39 provided in the second bearing shield 25b, so that they can be electrically energized from the outside. The feedthrough 39 is arranged in the second bearing shield 25b radially outside of the coolant distributor chamber 4 or the coolant collector chamber 5, respectively, with respect to the radial direction.

Figure 9:
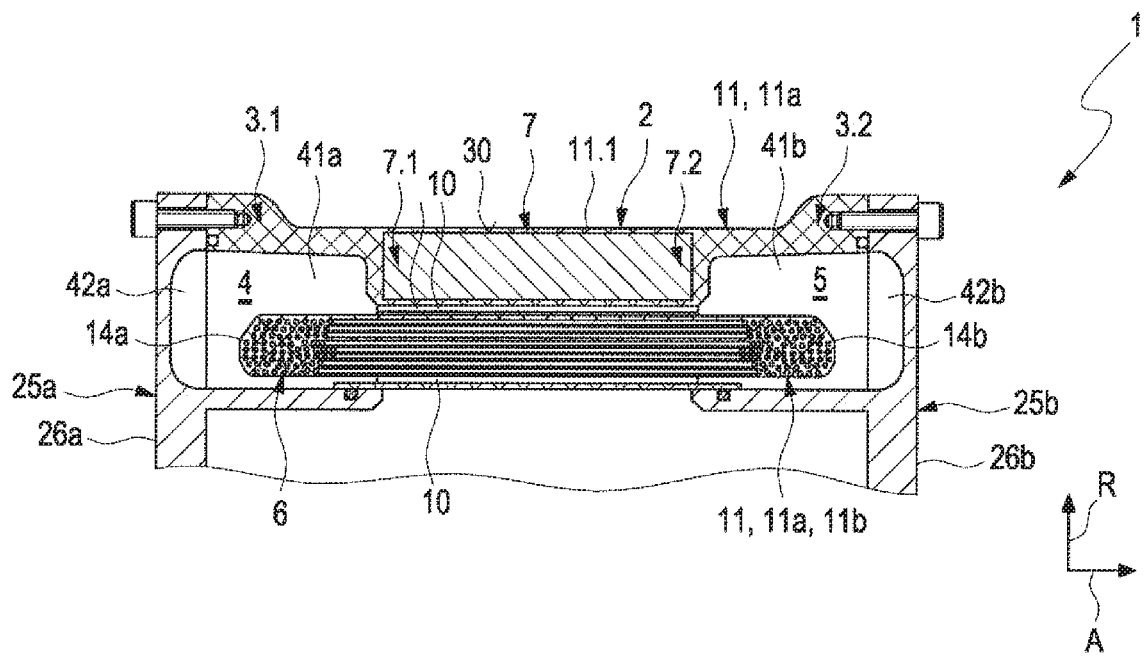
FIG. 9 shows a variation of the electrical machine shown in FIG. 1, which provides for a particularly effective cooling of the stator windings.

A further variation of the exemplary embodiment shown in FIG. 7 according to the disclosure is shown in FIG. 9. In the case of this further exemplary embodiment of the disclosure, the coolant distributor chamber 4 surrounds the first axial end section 14a of the respective stator winding 6 in a U-shaped manner, thus axially on the end side as well as radially on the inside and radially on the outside, in the longitudinal section along the axis of rotation D shown in FIG. 9. The coolant collector chamber 5 accordingly surrounds the second axial end section 14b of the respective stator winding 6 in a U-shaped manner, thus axially on the end side as well as radially on the inside and radially on the outside, in the longitudinal section along the axis of rotation D. In the case of this exemplary embodiment according to the disclosure, cooling ducts 10 are provided radially inside as well as radially outside of the stator winding 6. The respective stator windings 6, including their axial end sections 14a and 14b, are thus in direct thermal contact with the coolant K via the cooling ducts 10 as well as the coolant distributor chamber 4 as well as the coolant collector chamber 5. This allows for a particularly effective cooling of the stator winding 6 including the axial end sections 14a and 14b, which are subjected to special thermal loads.

It is understood that the foregoing description is that of the exemplary embodiments of the disclosure and that various changes and modifications may be made thereto without departing from the spirit and scope of the disclosure as defined in the appended claims.

What is claimed is:

1. An electrical machine, in particular for a vehicle, the electrical machine comprising:
    a rotor, which can be rotated about an axis of rotation, which defines an axial direction of the electrical machine;
    a stator, which has stator windings;
    at least one cooling duct, through which a coolant can flow;
    a coolant distributor chamber for cooling the stator windings; and
    a coolant collector chamber arranged at an axial distance to said coolant distributor chamber,
    wherein the coolant distributor chamber communicates fluidically with the coolant collector chamber by the at least one cooling duct, through which the coolant can flow,
    wherein the stator has stator teeth, which extend along the axial direction, which are arranged spaced apart from one another along a circumferential direction, and which support the stator windings,
    wherein least one stator winding is embedded into an electrically insulating plastic for the thermal coupling,
    wherein the electrically insulating plastic is arranged with at least one stator winding in at least one space, which is embodied between two stator teeth, which are adjacent in the circumferential direction,
    wherein the electrically insulating plastic is formed by a first plastic compound of a first plastic material, and by a second plastic compound of a second plastic material,
    wherein the first or/and second plastic compound at least partially surrounds at least one winding section of a stator winding, which protrudes axially from a space, and thereby partially limits the coolant distributor chamber and/or the coolant collector chamber, so that this winding section is electrically insulated with respect to the coolant during operation of the electrical machine,
    wherein the at least one stator winding is embedded into the first plastic compound of the first plastic material in the at least one space,
    wherein the first plastic compound, with the stator winding embedded therein, is at least partially surrounded by the second plastic compound of the second plastic material,
    wherein surface sections of the stator, which limit the space, are at least partially coated with the second plastic compound,
    wherein the stator is arranged axially between a first and a second bearing shield,
    wherein a portion of the coolant distributor chamber is arranged in a first bearing shield and the portion of the coolant collector chamber in the second bearing shield,
    wherein the coolant distributor chamber and the coolant collector chamber are each partially formed by a first hollow space and a second hollow space, which is provided in the first plastic compound,
    wherein the first hollow space is supplemented with a hollow space embodied in the first bearing shield to form the coolant distributor chamber, and the second hollow space is supplemented with the hollow space embodied in the second bearing shield to form the coolant collector chamber,
    wherein, in a longitudinal section along the axis of rotation, the coolant distributor chamber and the coolant collector chamber surround a first or second axial end section, respectively, of the respective stator winding in a U-shaped manner, thus axially on the end side as well as radially on the inside and radially on the outside,
    wherein the at least one cooling duct is arranged radially inside and at least one further cooling duct is arranged radially outside of the respective stator winding in the space,
    wherein at least one radially inner cooling duct is embodied as tube body, which surrounds a tube body internal space,
    wherein, in a cross-section perpendicular to the axis of rotation, the tube body forming a radially inner cooling duct is injection molded completely with the first plastic compound, and a radially outer cooling duct is injection molded completely with the second plastic compound.

2. The electrical machine according to claim 1, wherein:
    a thermal conductivity of the first plastic material is larger than the thermal conductivity of the second plastic material, or
    the thermal conductivity of the first plastic material is smaller than the thermal conductivity of the second plastic material, or
    the thermal conductivity of the first plastic material is identical to the thermal conductivity of the second plastic material.

3. The electrical machine according to claim 1, wherein the coolant distributor chamber and/or the coolant collector chamber is exclusively arranged in an axial extension of the stator adjacent to the latter and does not protrude therefrom along a radial direction or the stator, respectively.

4. The electrical machine according to claim 1, wherein the first plastic component and the second plastic compound are arranged in at least two spaces, or in all spaces.

5. The electrical machine according to claim 1, wherein:
    the first plastic material includes a thermoset or a thermoplastic or is the thermoset or the thermoplastic, and/or
    the second plastic material includes the thermoplastic or the thermoset or is the thermoplastic or the thermoset.

6. The electrical machine according to claim 1, wherein the at least one cooling duct is arranged in the electrically insulating plastic.

7. The electrical machine according to claim 1, wherein the at least one cooling duct is formed by at least one, or by a plurality of aperture/apertures, which is/are provided in the electrically insulating plastic, or in the second plastic compound, and through which the coolant can flow.

8. The electrical machine according to claim 7, wherein the second plastic compound at least partially, or completely surrounds or encases at the least one aperture, or in each case all apertures, in the cross-section perpendicular to the axial direction.

9. The electrical machine according to claim 7, wherein the at least one aperture has a geometry of a rectangle including two broad sides and two narrow sides in the cross-section perpendicular to the axial direction.

10. The electrical machine according to claim 1, wherein the at least one cooling duct is at least partially, or completely surrounded or encased by the electrically insulating plastic, or by the second plastic compound.

11. The electrical machine according to claim 1, wherein the coolant distributor chamber and/or the coolant collector chamber are at least partially arranged in the electrically insulating plastic, or in the first plastic compound, for thermally coupling to the stator windings.

12. The electrical machine according to claim 1, wherein the coating of the second plastic compound encloses the respective stator winding inside the space over at least an entire length of the respective space, measured along the axial direction, in the U-shaped manner in the circumferential direction.

13. The electrical machine according to claim 12, wherein the coating of the second plastic compound encloses the respective stator winding inside the space over at least the entire length of the respective space, measured along the axial direction, in the U-shaped manner in the circumferential direction.

14. The electrical machine according to claim 1, wherein the first and the second plastic compound together fill the at least one space completely.

15. The electrical machine according to claim 1, wherein the first and the second plastic compound are in each case formed by an injection molding compound of the first or the second plastic material, respectively.

16. The electrical machine according to claim 1, wherein:
the stator includes a ring-shaped stator body, and
the first plastic compound is arranged on an outer circumferential side of the stator body.

17. The electrical machine according to claim 1, wherein the first plastic compound embodies an outer coating on an outer circumferential side.

18. The electrical machine according to claim 1, wherein at least the first plastic compound protrudes axially from the space.

19. The electrical machine according to claim 1, wherein the first plastic compound at least partially limits the coolant distributor chamber and/or the coolant collector chamber.

20. The electrical machine according to claim 1, wherein the at least one cooling duct and the electrically insulating plastic are provided in at least one, or in each space between the two stator teeth, which are in each case adjacent in the circumferential direction.

21. The electrical machine according to claim 1, wherein at least one tube body is electrically insulated from the stator body, in particular from the stator teeth, by a first and/or second plastic compound.

22. The electrical machine according to claim 1, wherein:
the tube body is embodied as flat tube, and
in the cross-section perpendicular to the axial direction, at least one broad side of the flat tube extends substantially perpendicular to a radial direction.

23. The electrical machine according to claim 1, wherein the at least one stator winding is electrically insulated from the at least one cooling duct, which is embodied as the tube body, by a first and/or second plastic compound.

24. The electrical machine according to claim 1, wherein the at least one stator winding is embodied in such a way that it is electrically insulated from the coolant and/or from the stator body at least in an area inside the respective space during operation of the electrical machine by a first and/or second plastic compound.

25. The electrical machine according to claim 1, wherein:
the at least one cooling duct is arranged in the stator body and is formed by at least one aperture, through which the coolant can flow, and
the at least one aperture is completely limited or encased or surrounded by the electrically insulating plastic, or by the second plastic compound.

26. The electrical machine according to claim 25, wherein the at least one aperture, which forms the at least one cooling duct and which is arranged in the stator body, is embodied to be open towards the space and is closed in a fluid-tight manner by the electrically insulating plastic, or by the second plastic compound, which is arranged in the space.

27. The electrical machine according to claim 1, wherein the at least one cooling duct is arranged in the stator body in an area between two adjacent stator teeth with respect to the circumferential direction.

28. The electrical machine according to claim 1, wherein at least two cooling ducts, or all available cooling ducts, are embodied in such a way that, during operation of the electrical machine, the coolant guided through these cooling ducts flows from a first axial end section of the stator, or of the stator body, in a direction of a second axial end section of the stator or of the stator body, respectively, or vice versa.

29. The electrical machine according to claim 1, wherein that the stator windings are part of a distributed winding.

30. The vehicle, in particular a motor vehicle, comprising at least one electrical machine according to claim 1.

* * * * *